(12) United States Patent
Ahn

(10) Patent No.: US 12,451,556 B2
(45) Date of Patent: Oct. 21, 2025

(54) ELECTRIC AIRCRAFT

(71) Applicant: KOREA AEROSPACE RESEARCH INSTITUTE, Daejeon (KR)

(72) Inventor: Hyo Jung Ahn, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 22 days.

(21) Appl. No.: 18/569,791

(22) PCT Filed: Aug. 18, 2022

(86) PCT No.: PCT/KR2022/012319
§ 371 (c)(1),
(2) Date: Dec. 13, 2023

(87) PCT Pub. No.: WO2023/038318
PCT Pub. Date: Mar. 16, 2023

(65) Prior Publication Data
US 2024/0132223 A1  Apr. 25, 2024
US 2024/0228050 A9  Jul. 11, 2024

(30) Foreign Application Priority Data

Sep. 13, 2021  (KR) .................. 10-2021-0121453

(51) Int. Cl.
*B64D 27/357* (2024.01)
*B64C 3/18* (2006.01)
(Continued)

(52) U.S. Cl.
CPC ............ *H01M 50/298* (2021.01); *B64C 3/18* (2013.01); *B64C 3/32* (2013.01); *B64D 27/31* (2024.01); *B64D 27/357* (2024.01); *H01M 50/249* (2021.01); *H01M 50/51* (2021.01); *B60L 2200/10* (2013.01); *H01M 2220/20* (2013.01)

(58) Field of Classification Search
CPC ............................... B64C 3/32; B64D 27/357
See application file for complete search history.

(56) References Cited

U.S. PATENT DOCUMENTS 3,937,424 A * 2/1976 Meier .................... B64D 27/34
429/99
10,559,792 B1 * 2/2020 Combs ................ H01M 50/249
(Continued)

FOREIGN PATENT DOCUMENTS

KR    20160115864 A * 10/2016 ............. B64G 1/443

*Primary Examiner* — Joshua J Michener
*Assistant Examiner* — Ryan Andrew Yankey
(74) *Attorney, Agent, or Firm* — RABIN & BERDO, P.C.

(57) ABSTRACT

An electric aircraft according to an embodiment of the present invention comprises: a fuselage equipped with a power means, a front spar and a rear spar extending from the fuselage to an end of a wing, and a plurality of ribs extending from the rear spar to the front spar and coupled to the front spar and the rear spar, in which a plurality of solid state batteries are mounted in a plurality of individual spaces partitioned by the front spar, the rear spar, and the plurality of ribs, respectively, and the front spar and the rear spar are used as members for serial connection of the plurality of solid state batteries, and the plurality of ribs are used as members for parallel connection of the plurality of solid state batteries.

3 Claims, 2 Drawing Sheets

(51) Int. Cl.
  *B64C 3/32* (2006.01)
  *B64D 27/31* (2024.01)
  *H01M 50/249* (2021.01)
  *H01M 50/298* (2021.01)
  *H01M 50/51* (2021.01)

(56) References Cited

U.S. PATENT DOCUMENTS

| | | | |
|---|---|---|---|
| 11,299,024 B2* | 4/2022 | Linde | B64C 31/024 |
| 11,316,224 B2* | 4/2022 | Zimmermann | B60L 50/66 |
| 11,530,026 B2* | 12/2022 | Bernhardt | B60L 50/66 |
| 2014/0179535 A1 | 6/2014 | Stückl et al. | |
| 2018/0099756 A1* | 4/2018 | Gore | H01M 50/519 |
| 2018/0123165 A1* | 5/2018 | Park | H01M 50/213 |
| 2021/0391627 A1* | 12/2021 | Villanueva | H01M 50/358 |

* cited by examiner

ELECTRIC AIRCRAFT

TECHNICAL FIELD

The present invention relates to an electric aircraft, and more specifically, to an electric aircraft in which a wing portion of the aircraft is implemented with a solid state battery.

BACKGROUND ART

A solid state battery is a next-generation secondary battery in which the electrolyte conducting electricity between positive and negative electrodes of the battery is solid rather than liquid. Currently, the most widely used lithium-ion battery has a liquid electrolyte and is energy efficient, but its lifespan is relatively short and the electrolyte is a flammable liquid, so there is a high risk of explosion at high temperature. Compared to this, solid state batteries with the electrolyte in solid state are relatively safe, because there is no risk of liquid leakage due to impact, and the possibility of ignition is low thanks to the absence of flammable substances. In addition, a pouch-type full-cell solid state battery manufacturing technology has been ensured, which has characteristics of free deformation and maintained stability even when the inside is exposed to the air, and applicability to a large area.

However, most electric aircrafts currently use liquid electrolyte batteries such as lithium-ion batteries as their energy storage devices, which are applied in the limited form due to the structure of the aircrafts and which also have a negative effect on the weight of the aircrafts. In addition, in the related aircrafts employing electric propulsion systems that utilize existing batteries, solar energy, fuel cells, and other hybrid systems, the skins of the wings and fuselage and their support structures are maintained, causing a negative effect on the weight.

Prior Art: US 2014/0179535 A1 (published on Jun. 26, 2014)

DETAILED DESCRIPTION OF INVENTION

Technical Problem

An object of the present invention is to provide an electric aircraft that improves the shortcoming of the related electric aircraft as described above by implementing an aircraft wing portion with a solid state battery and that utilizes the solid state battery as a wing skin.

Technical Solution

In order to achieve the object mentioned above, an electric aircraft according to an embodiment of the present invention may include a fuselage equipped with a power means, a front spar and a rear spar extending from the fuselage to an end of a wing, and a plurality of ribs extending from the rear spar to the front spar and coupled to the front spar and the rear spar, in which a plurality of solid state batteries may be mounted in a plurality of individual spaces partitioned by the front spar, the rear spar, and the plurality of ribs, respectively, and the front spar or the rear spar may be used as a member for serial connection of the plurality of solid state batteries, and the plurality of ribs may be used as members for parallel connection of the plurality of solid state batteries.

In addition, the plurality of solid state batteries may be connected in parallel in a direction from the front spar to the rear spar in each of the plurality of individual spaces, and the plurality of solid state batteries individually arranged in the individual spaces adjacent to each other may be connected to each other in series.

In addition, the power means may be electrically connected to, through a first cable, a solid state battery of the plurality of solid state batteries which is located closest to the fuselage, and may be electrically connected to, through a second cable, a solid state battery located furthest from the fuselage.

In addition, the second cable may be fixed to the front spar and extended along the front spar.

In addition, the plurality of solid state batteries individually arranged in the individual spaces adjacent to each other may be connected to each other in series using a third cable, and the third cable may be fixedly mounted on each of the ribs.

In addition, a surface of the plurality of solid state batteries may be used as a skin of the wing.

Effects of Invention

The electric aircraft according to the embodiment of the present invention having the configuration described above has the following effects.

The electrically driven aircraft according to the present embodiment improves the disadvantage of weight in the aircraft employing the electric propulsion system using existing batteries, solar energy, fuel cells, and other hybrid systems, which is caused by maintaining the skin of the wings and fuselage and its support structure as it is.

In addition, the spars and ribs of the wings are used as the supports for mounting the solid state batteries, and the surface of the solid state batteries is used instead of the wing skin.

Meanwhile, it goes without saying that although not explicitly stated, the present invention includes other effects that can be expected from the configuration described above.

BEST MODE FOR EMBODYING INVENTION

Hereinafter, preferred embodiments of the present invention will be described in detail with reference to the accompanying drawings, which will be readily apparent to those skilled in the art to which the present invention pertains. However, the present invention can be implemented in various other different forms and should not be construed as being limited to certain examples described herein.

Figure 1:
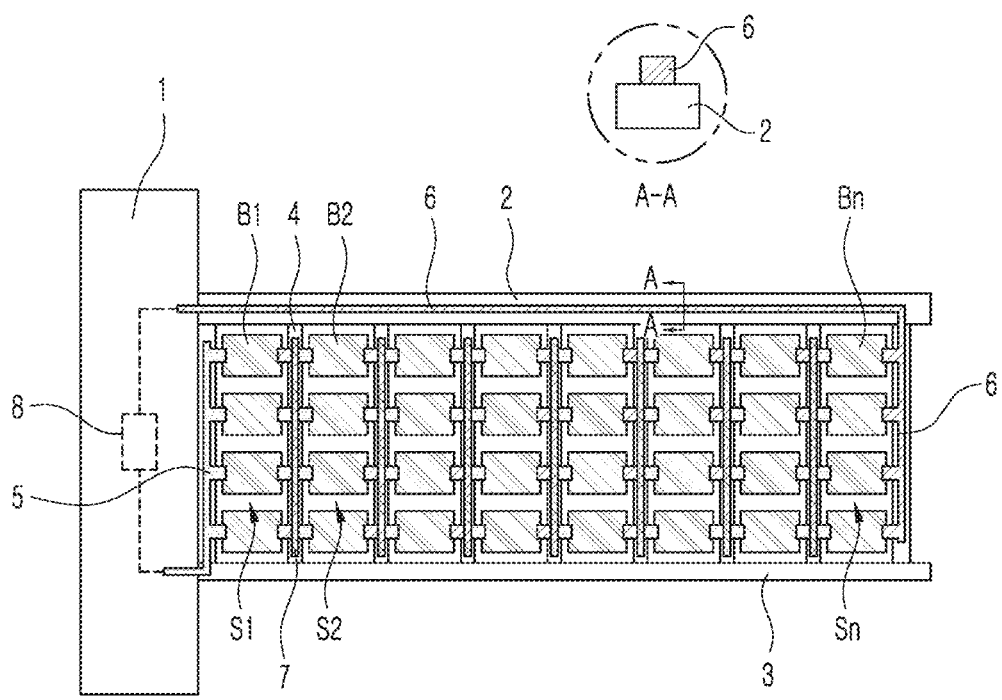
FIG. 1 is a plan schematic diagram of a main configuration of an electric aircraft according to an embodiment of the present invention.

FIG. 1 is a plan schematic diagram of a main configuration of an electric aircraft according to an embodiment of the present invention. For reference, FIG. 1 shows only the main configuration related to the present invention, and for convenience of explanation, the illustration of configurations irrelevant to the gist of the present invention is omitted. In addition, the following description is limited to the gist of the present invention, and descriptions of configuration irrelevant to the gist of the present invention are omitted or simplified.

As shown in FIG. 1, an electric aircraft (hereinafter referred to as "electric aircraft") according to an embodiment of the present invention includes a fuselage 1 equipped with a power means 8 such as a drive motor system for example, a front spar 2 and a rear spar 3 extending from the fuselage 1 to an end of a wing, and a plurality of ribs 4 extending from the rear spar 3 to the front spar 2 and coupled to the front spar 2 and the rear spar 3.

Figure 2:
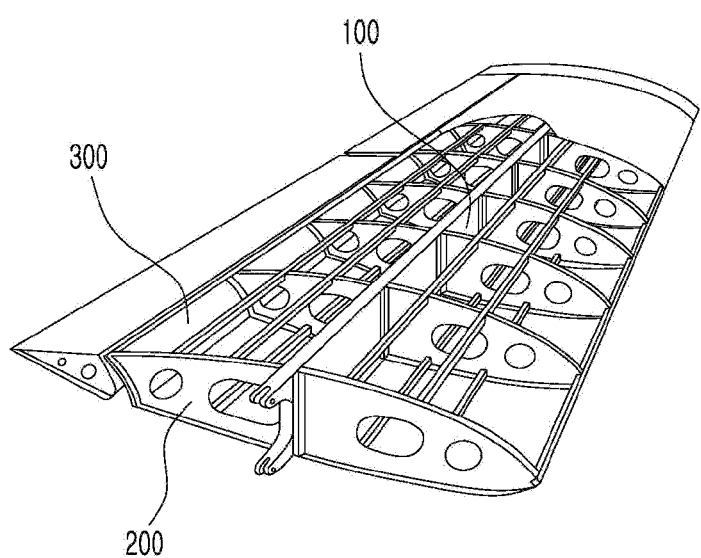
FIG. 2 is a diagram showing a structure of a typical aircraft wing.

As is well known, referring to FIG. 2 showing a typical aircraft wing structure, the spars, that is, the front spar 100 and the rear spar 300, also called wing beams, correspond to supports that bear the load generated by bending of the wing. In addition, the ribs are arranged from the front side (leading edge) of the wing to the rear wing beam or rear side (trailing edge) to form airfoil shape, and serve the function of shaping the wing to be cambered, and transferring the load to the spars.

Referring to FIG. 1, in this electric aircraft, a plurality of solid-state batteries B1, B2, ..., and Bn are installed in a plurality of individual spaces S1, S2, ..., and Sn partitioned by the front spar 2, the rear spar 3, and the plurality of ribs 4, respectively. Specifically, a plurality of solid state batteries are installed in parallel in each of the plurality of individual spaces S1, S2, ..., and Sn. In this embodiment, it is illustrated that four solid state batteries are installed in parallel in each of the individual spaces S1, S2, ..., and Sn, but the number of solid state batteries may vary as needed. Meanwhile, the structure for fixing the solid state batteries is irrelevant to the gist of the present invention, and it is apparent that various known fastening and fixing means such as brackets, fasteners, and hinges can be used. In addition, for convenience of explanation, the spaces between batteries are somewhat exaggerated in FIG. 1, but it is desirable that the size and arrangement of the batteries are determined in a manner in which the spaces between the batteries are as small as possible to minimize air flow in a direction into the paper of FIG. 1.

As shown in FIG. 1, the front spar 1 or the rear spar 2 is used as a member for serial connection of a plurality of solid state batteries, and a plurality of ribs 4 are used as members for parallel connection of a plurality of solid state batteries.

Specifically, a plurality of solid state batteries are connected in parallel in the direction from the front spar 2 to the rear spar 3 in each of the plurality of individual spaces S1, S2, ..., and Sn. It is shown that four solid state batteries are connected in parallel in each individual space.

In addition, a plurality of solid state batteries individually arranged in individual spaces adjacent to each other are connected to each other in series. For example, a plurality of solid state batteries B1 arranged in the individual space S1 and a plurality of solid state batteries B2 arranged in the individual space S2 are connected to each other in series. For this purpose, a third cable 7 is used, and the third cable 7 may be fixedly mounted on each rib 4.

Meanwhile, the surface of the plurality of solid state batteries may serve as the skin of the wings in the electric aircraft. That is, in the present embodiment, the surface of the wing on which the plurality of solid state batteries are arranged does not have a wing skin like that in a related aircraft, and a plurality of solid state batteries are processed so that the external shape thereof form a contour corresponding to the wing surface when arranged, thereby contributing to reducing the weight of the aircraft. Accordingly, it is possible to implement the desired outer shape by utilizing the characteristics of the solid state batteries that can be freely shaped.

In the present embodiment, the power means, for example, the drive motor system is electrically connected to, through a first cable, the solid state battery B1 of the plurality of solid state batteries which is located closest to the fuselage 1, and is electrically connected to, through a second cable 6, the solid state battery Bn located furthest from the fuselage 1. In this example, the second cable 6 is fixed to the front spar 2 and extended along the front spar 2. The second cable 6 may be a coated band wire. Of course, the second cable 6 may be extended along the rear spar 3 instead of the front spar 2.

As described above, the electrically driven aircraft according to the present embodiment improves the disadvantage of weight in the aircraft employing the electric propulsion system using existing batteries, solar energy, fuel cells, and other hybrid systems, which is caused by maintaining the skin of the wings and fuselage and its support structure as it is. In addition, the spars and ribs of the wings are used as the supports for mounting the solid state batteries, and the surface of the solid state batteries is used instead of the wing skin.

Although the present invention has been described in connection with some examples herein, the present invention should not be limited to those examples only, and various other changes and modifications made by those skilled in the art from the basic concept of the disclosure are also within the scope of the claims appended herein.

INDUSTRIAL APPLICABILITY

The present invention can be used in electric aircrafts.

The invention claimed is:

1. An electric aircraft comprising:
a fuselage equipped with a drive motor for driving rotors;
a front spar and a rear spar extending from the fuselage to an end of a wing; and
a plurality of ribs extending from the rear spar to the front spar and coupled to the front spar and the rear spar,
wherein a plurality of solid state batteries are mounted in a plurality of individual spaces partitioned by the front spar, the rear spar, and the plurality of ribs, respectively, and
the front spar or the rear spar is used as a member for serial connection of the plurality of solid state batteries, and the plurality of ribs are used as members for parallel connection of the plurality of solid state batteries,
wherein the plurality of solid state batteries are connected in parallel in a direction from the front spar to the rear spar in each of the plurality of individual spaces,
wherein the plurality of solid state batteries individually arranged in the individual spaces adjacent to each other are connected to each other in series, and
wherein the drive motor is electrically connected to, through a first cable, a solid state battery of the plurality of solid state batteries which is located closest to the fuselage, and is electrically connected to, through a second cable, a solid state battery located furthest from the fuselage.

2. The electric aircraft according to claim 1, wherein the second cable is fixed to the front spar and extended along the front spar.

3. The electric aircraft according to claim 2, wherein the plurality of solid state batteries individually arranged in the individual spaces adjacent to each other are connected to each other in series using a third cable, and the third cable is fixedly mounted on each of the ribs.

\* \* \* \* \*